US010771121B2

(12) United States Patent
Chae et al.

(10) Patent No.: US 10,771,121 B2
(45) Date of Patent: Sep. 8, 2020

(54) METHOD FOR PERFORMING BEAM SEARCH OR BEAM TRANSMISSION IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/300,409

(22) PCT Filed: May 12, 2017

(86) PCT No.: PCT/KR2017/004945
§ 371 (c)(1),
(2) Date: Nov. 9, 2018

(87) PCT Pub. No.: WO2017/196124
PCT Pub. Date: Nov. 16, 2017

(65) Prior Publication Data
US 2019/0245592 A1    Aug. 8, 2019

Related U.S. Application Data

(60) Provisional application No. 62/335,667, filed on May 12, 2016, provisional application No. 62/445,728, filed on May 12, 2016.

(51) Int. Cl.
*H04B 7/04*     (2017.01)
*H04B 7/0413*   (2017.01)
(Continued)

(52) U.S. Cl.
CPC ......... *H04B 7/0413* (2013.01); *H04B 7/0404* (2013.01); *H04B 7/0408* (2013.01)

(58) Field of Classification Search
CPC .......................... H04B 7/0408; H04B 7/0413
See application file for complete search history.

(56) References Cited

U.S. PATENT DOCUMENTS 7,035,652 B1     4/2006 Kelkar
9,843,938 B2 *  12/2017 Kang ................. H04B 7/0689
(Continued)

FOREIGN PATENT DOCUMENTS

JP      2012-214178 A     11/2012
WO   WO 2006/021235 A1    3/2006
WO   WO 2014/124237 A1    8/2014

OTHER PUBLICATIONS

Navda et al., "MobiSteer: Using Steerable Beam Directional Antenna for Vehicular Network Access," MobiSys'07, San Juan, Puerto Rico, Jun. 11-14, 2007, 15 pages.
(Continued)

*Primary Examiner* — Nader Bolourchi
(74) *Attorney, Agent, or Firm* — Birch, Stewart, Kolasch & Birch, LLP

(57) ABSTRACT

An embodiment of the present invention relates to a method for performing beam search or beam transmission by a first UE in a wireless communication system, the method comprising the steps of: receiving location information from a second UE; and performing at least one of beam search and beam transmission for an area determined on the basis of the received location information, wherein one or more of a beam direction, a beam first search direction, and a beam width for the beam search or the beam transmission are determined according to one or more of a location, a speed, and a moving direction of the first UE, and a service and a required packet delay value for the first UE.

11 Claims, 11 Drawing Sheets

(a)

(b)

(51) Int. Cl.
  *H04B 7/0408* (2017.01)
  *H04B 7/0404* (2017.01)

(56) References Cited

U.S. PATENT DOCUMENTS

| | | |
|---|---|---|
| 2009/0196362 A1* | 8/2009 | Song .................. H04B 7/0408 |
| | | 375/260 |
| 2009/0310608 A1 | 12/2009 | Chen et al. |
| 2010/0248672 A1 | 9/2010 | Orlik et al. |
| 2013/0282277 A1 | 10/2013 | Rubin et al. |
| 2017/0026101 A1* | 1/2017 | Kang .................. H04B 7/0456 |
| 2017/0201309 A1* | 7/2017 | Kang .................. H04B 7/0695 |
| 2017/0214507 A1* | 7/2017 | Kang .................. H04L 5/0048 |
| 2017/0222708 A1* | 8/2017 | Kang .................. H04B 7/0617 |
| 2017/0223744 A1* | 8/2017 | Qian .................. H04W 16/28 |
| 2018/0054244 A1* | 2/2018 | Kim .................. H04B 7/065 |
| 2018/0076870 A1* | 3/2018 | Kim .................. H04L 5/0048 |
| 2019/0007846 A1* | 1/2019 | Lee .................. H04W 52/383 |

OTHER PUBLICATIONS

Subramanian et al., "A Measurement Study of Inter-Vehicular Communication Using Steerable Beam Directional Antenna," VANET'08, San Francisco, California, Sep. 15, 2008, 11 pages.
Choi et al., "Millimeter Wave Vehicluar Communcation to Support Massive Automotive Sensing", ARXIV.org, Cornell University Library, Feb. 20, 2016, XP080684933, pp. 1-7 (7 pages total).

* cited by examiner (a)

(b)

(a)

(b)

DL control
DL data or UL data
UL control

METHOD FOR PERFORMING BEAM SEARCH OR BEAM TRANSMISSION IN WIRELESS COMMUNICATION SYSTEM

CROSS REFERENCE TO RELATED APPLICATIONS

This application is the National Phase of PCT International Application No. PCT/KR2017/004945, filed on May 12, 2017, which claims priority under 35 U.S.C. 119(e) to U.S. Provisional Application Nos. 62/335,667, filed on May 12, 2016 and 62/445,728, filed on Jan. 12, 2017, all of which are hereby expressly incorporated by reference into the present application.

TECHNICAL FIELD

The present invention relates to a wireless communication system, and more particularly, to a method and apparatus for performing beam searching or beam transmission.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Device-to-Device (D2D) communication means a communication system for directly exchanging audio, data and the like between user equipments without passing through a base station (evolved NodeB: eNB) by establishing a direct link between the user equipments. D2D communication may include such a system as a UE-to-UE (user equipment-to-user equipment) communication, Peer-to-Peer communication and the like. And, the D2D communication system may be applicable to M2M (Machine-to-Machine) communication, MTC (Machine Type Communication) and the like.

D2D communication is currently considered as one of schemes for setting a load put on a base station due to the rapidly increasing data traffic. For instance, according to D2D communication, unlike an existing wireless communication system, since data is exchanged between devices without passing through a base station, overload of a network can be reduced. Moreover, by introducing D2D communication, it is able to expect effects such as procedure reduction of a base station, power consumption reduction of devices involved in D2D, data transmission speed increase, reception capability increase of a network, load distribution, extension of cell coverage and the like.

Currently, discussion on V2X (Vehicle to Everything) communication is in progress in a form associated with D2D communication. The V2X communication corresponds to a concept including V2V communication between vehicle UEs, V2P communication between a vehicle and a UE of a different type, and V2I communication between a vehicle and an RSU (roadside unit).

DISCLOSURE OF THE INVENTION

Technical Task

The technical task of the present invention is to provide a method for performing beam searching or beam transmission by reflecting the characteristics of V2X communication.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

In an aspect of the present invention, provided is a method for performing beam searching or beam transmission by a first UE in a wireless communication system. The method may include: receiving location information from a second UE; and performing either or both of the beam searching and beam transmission for an area determined based on the received location information. In this case, at least one of a beam direction, a preferential beam searching direction, and a beam width for the beam searching or beam transmission may be determined according to at least one of a location, a speed, a moving direction, a service, and a packet latency requirement of the first UE.

In another aspect of the present invention, provided is a first UE device for performing beam searching or beam transmission in a wireless communication system. The first UE device may include: a transmitting module; a receiving module; and a processor. In this case, the processor may be configured to receive location information from a second UE through the receiving module and perform either or both of the beam searching and beam transmission for an area determined based on the received location information, and at least one of a beam direction, a preferential beam searching direction, and a beam width for the beam searching or beam transmission may be determined according to at least one of a location, a speed, a moving direction, a service, and a packet latency requirement of the first UE.

A frequency band in which the location information is received may be lower than a frequency band in which the either or both of the beam searching and beam transmission is performed.

The location information may be included in control information.

The location information may be valid only during a timer period indicated by a time stamp transmitted together with the location information.

When the first UE is in a parking lot, the beam direction may include all directions.

When the first UE is on a highway, the preferential beam searching direction may cover a smaller area than when the first UE is on a normal road.

When the first UE is on a highway, the beam width may be smaller than when the first UE is on a normal road.

As the speed of the first UE increases, the beam width for the beam searching decreases.

The moving direction of the first UE may change the at least one of the beam direction, the preferential beam searching direction, and the beam width.

The moving direction may be determined by at least one of a turn signal indicator of the first UE and a second of the first UE.

When the service relates to a safety message, the beam width may increase compared to when the service relates to other messages rather than the safety message.

When the packet latency requirement is low, the beam width may decrease compared to when the packet latency requirement is high.

The first UE may be a Vehicle User Equipment (VUE).

Advantageous Effects

According to the present invention, it is possible to reduce the overhead of beam searching or beam transmission.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
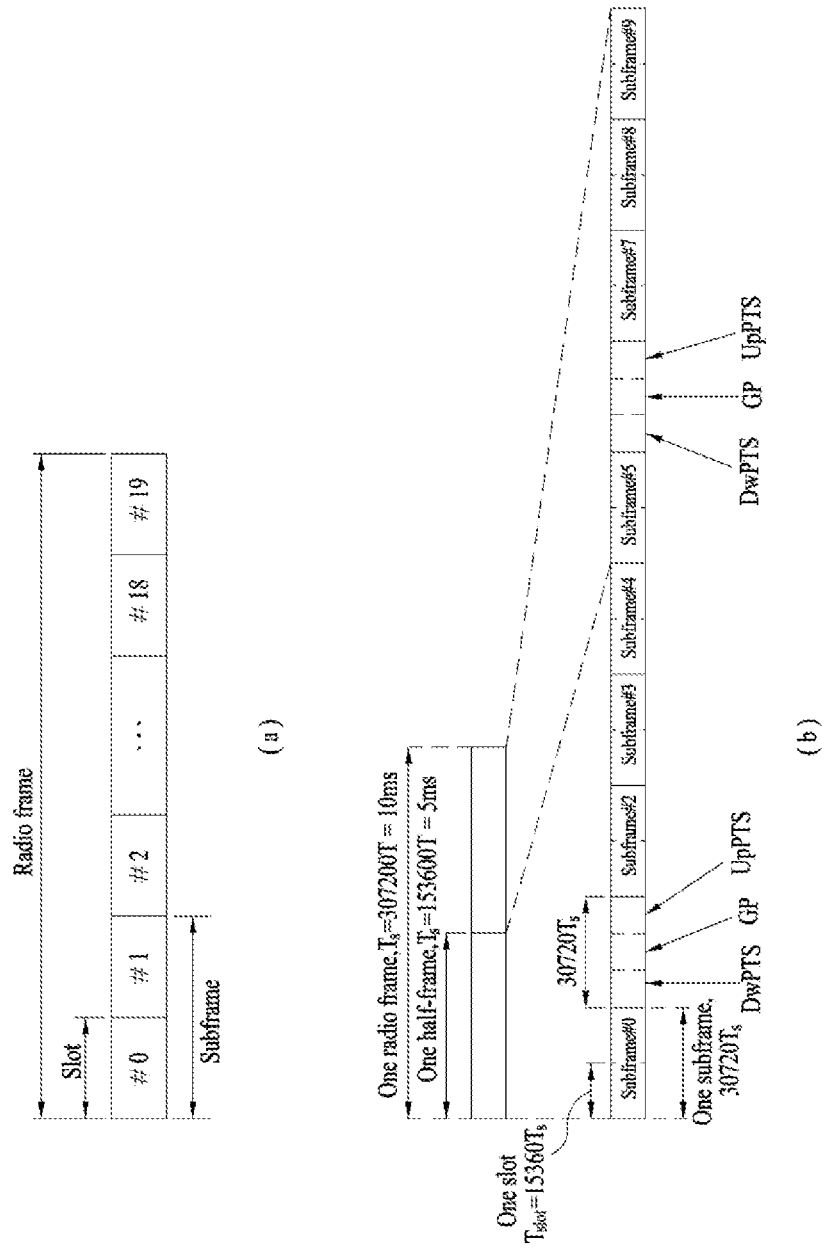
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
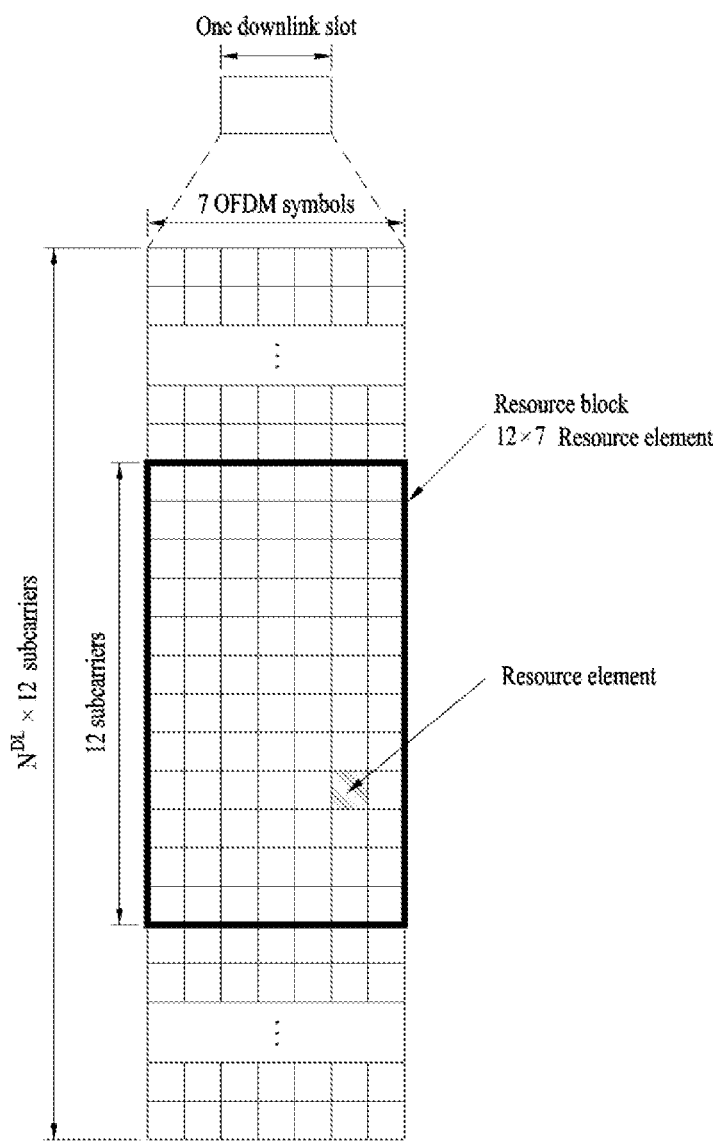
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
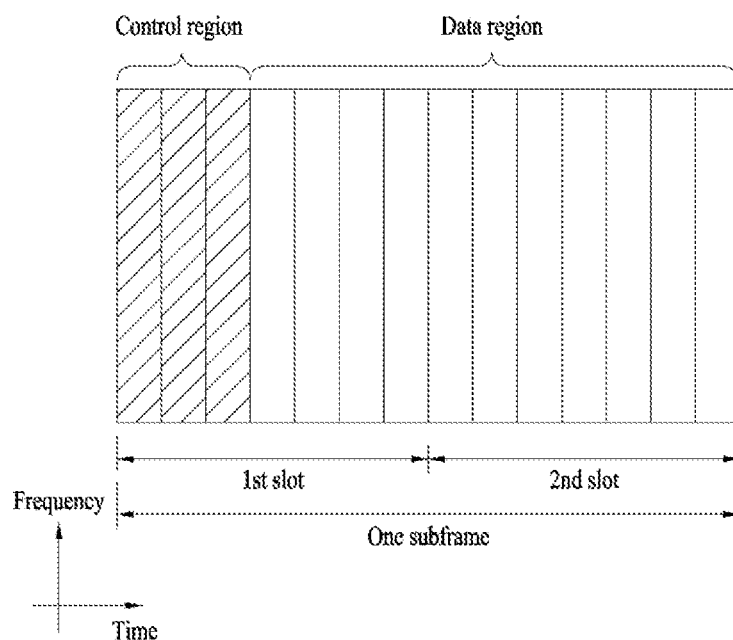
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
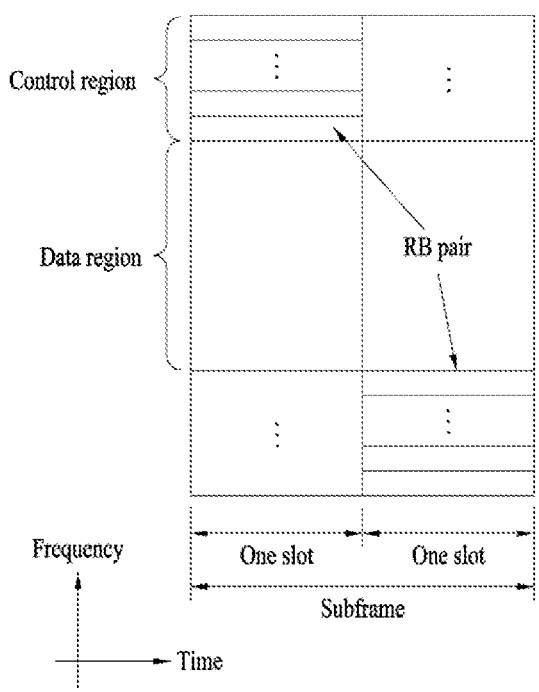
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
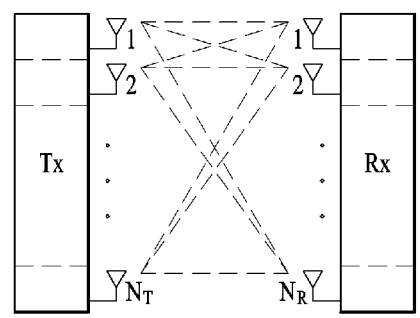
FIG. 5 is a diagram for a configuration of a wireless communication system having multiple antennas.
Figure 5:
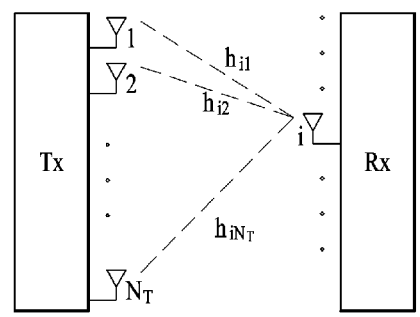

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$S = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, A, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix w serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the NR receive antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
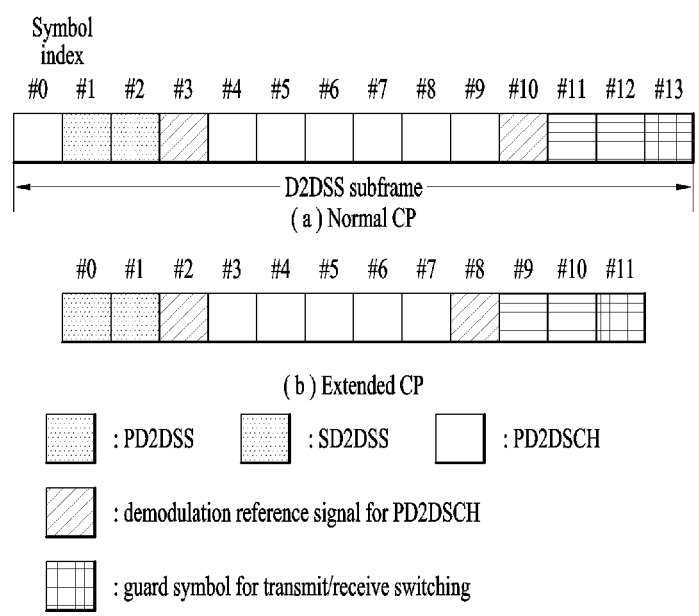
FIG. 6 is a diagram for a subframe in which a D2D synchronization signal is transmitted.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
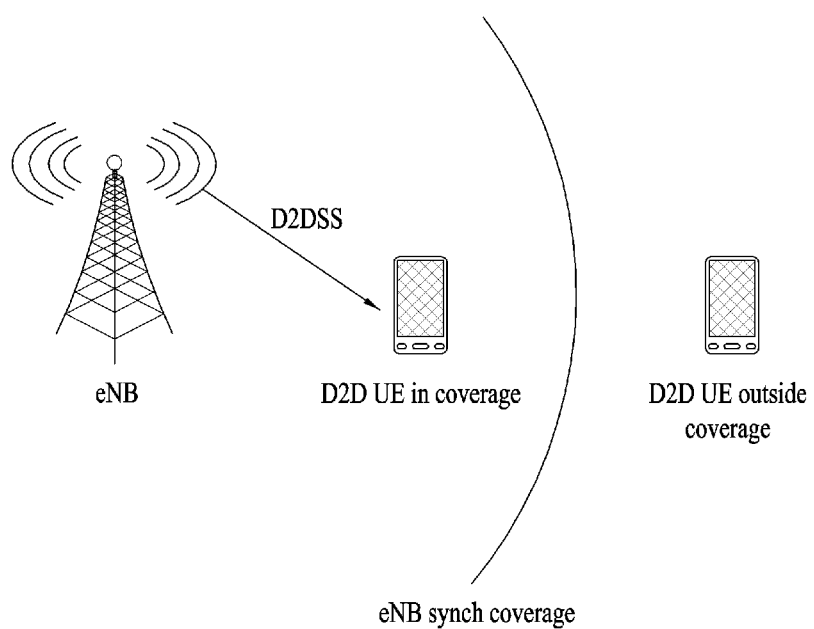
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

Figure 8:
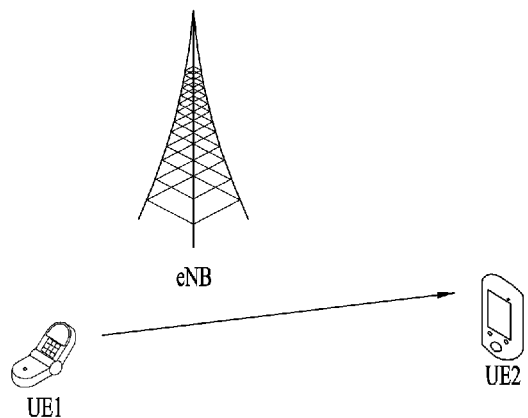
FIG. 8 is a diagram for an example of a D2D resource pool for performing D2D communication.
Figure 8:
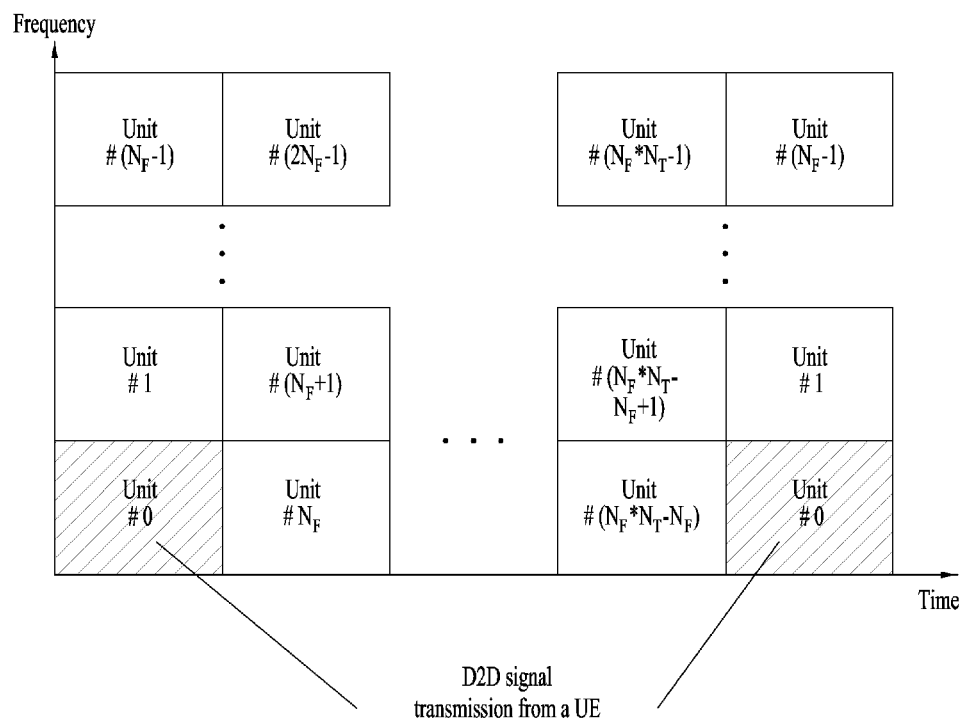

FIG. 8 shows an example of a UE1, a UE2 and a resource pool used by the UE1 and the UE2 performing D2D communication. In FIG. 8 (*a*), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8 (*b*) shows an example of configuring a resource unit. Referring to FIG. 8 (*b*), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
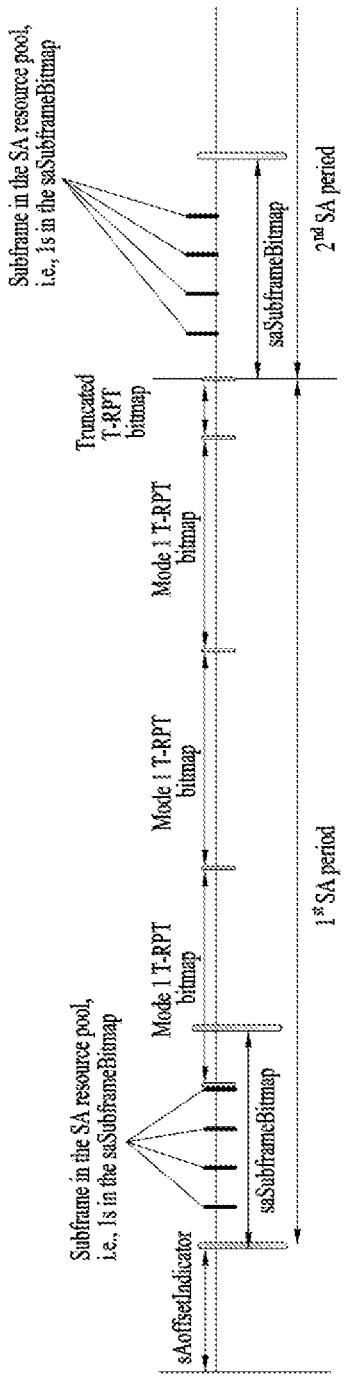
FIG. 9 is a diagram for explaining an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes.

Meanwhile, in V2V (vehicle to vehicle) communication, a CAM (cooperative awareness message) of a periodic message type, a DENM (decentralized environmental notification message) of an event triggered message type, and the like can be transmitted. The CAM can include dynamic status information of a vehicle such as direction and velocity, static data of a vehicle such as a size, and basic vehicle information such as external light status, path history, and the like. A size of the CAM may correspond to 50 to 300 bytes. The DENM may correspond to a message which is generated when an accidental status such as malfunction of a vehicle, an accident, and the like occurs. A size of the DENM may be less than 3000 bytes. All vehicles located within a transmission range of the DENM can receive the DENM. In this case, the DENM may have a priority higher than a priority of the CAM. In this case, in the aspect of a single UE, the higher priority means that a UE preferentially transmits a message of a higher priority when messages are transmitted at the same time. Or, the higher priority means that a UE intends to preferentially transmit a message of a higher priority in time among a plurality of messages. In the aspect of a plurality of UEs, since a message of a higher priority receives less interference compared to a message of a lower priority, it may be able to lower a reception error rate. If security overhead is included in the CAM, the CAM may have a bigger message size.

NR (New RAT (Radio Access Technology))

As more and more communication devices have required higher communication capacity, the necessity of the mobile broadband communications much improved than the existing radio access technology has increased. In addition, massive Machine Type Communications (MTC) capable of providing various services at anytime and anywhere by connecting a number of devices or things to each other has been considered as a main issue in the next generation communication system. Moreover, communication system design capable of supporting services/UEs sensitive to reliability and latency has been discussed. As described above, the introduction of the next generation radio access technology considering the enhanced mobile broadband communication, massive MTC, Ultra-Reliable and Low Latency Communication (URLLC), etc. has been discussed. In the present invention, the corresponding technology is referred to as NR.

Figure 10:
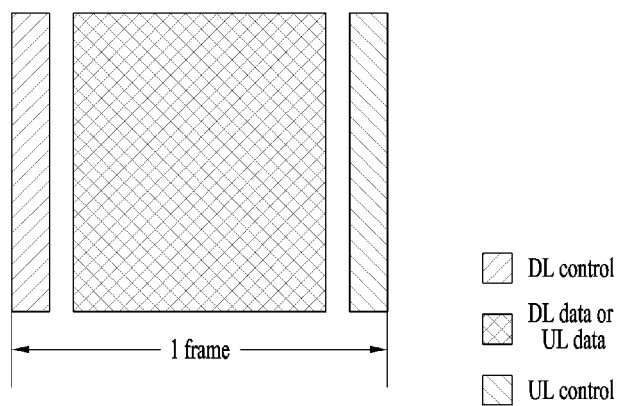
FIG. 10 illustrates a frame structure for new Radio Access Technology (RAT)

FIG. 10 illustrates a frame structure for the NR. Referring to FIG. 10, a self-contained structure capable of including a DL control channel, DL or UL data, and a UL control channel in one frame unit can be used. In this case, the DL control channel may carry DL data scheduling information, UL data scheduling information, etc., and the UL control channel may carry ACK/NACK information in response to DL data, Channel State Information (CSI) (e.g., modulation and coding scheme information, MIMO transmission related information, etc.), a scheduling request, etc. A time gap for DL-to-UL or UL-to-DL switching may exist between control and data regions. In addition, some of the DL control, DL data, UL data, and UL control may not be implemented in one frame, or the order of channels included in one frame may vary (for example, DL control/DL data/UL control/UL data, UL control/UL data/DL control/DL data, etc.).

Analog Beamforming

In the mmW/mmWave system, since a wavelength is shortened, a plurality of antennas may be installed in the same area. That is, considering that the wavelength at 30 GHz band is 1 cm, a total of 100 antenna elements may be installed in a 5 by 5 cm panel at intervals of 0.5 lambda (wavelength) in the case of a 2-dimensional array. Therefore, the mmW system may improve the coverage or throughput by increasing beamforming (BF) gain using multiple antenna elements.

In this case, if a transceiver unit (TXRU) is provided to each antenna element to enable adjustment of transmit power and phase, independent beamforming can be performed per frequency resource. However, installing TXRUs in all of the about 100 antenna elements is less feasible in terms of cost. Therefore, a method of mapping a plurality of antenna elements to one TXRU and adjusting the direction of a beam using an analog phase shifter has been considered. However, according to this analog beamforming method, only one beam direction is created over the full band so that selective beamforming is impossible.

To solve this problem, as an intermediate form of digital BF and analog BF, hybrid BF with B TXRUs that are fewer than Q antenna elements may be considered. In the case of the hybrid BF, the number of beam directions that can be transmitted at the same time is limited to B or less, which depends on how B TXRUs and Q antenna elements are connected.

Figure 11:
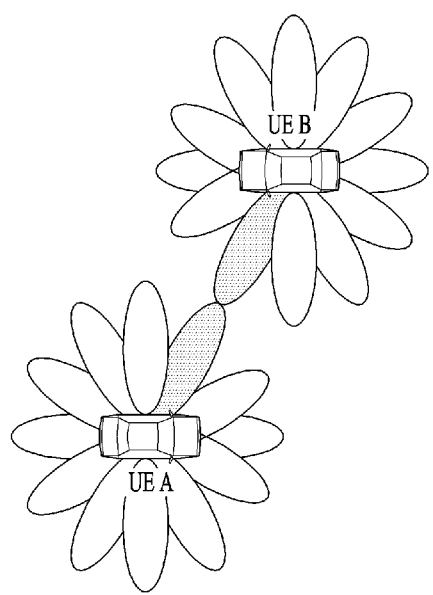
FIGS. 11 to 13 are diagrams for explaining various embodiments of the present invention.

When beamforming is applied to overcome the path loss in high bands such as mmW, a beam searching/scanning process needs to be performed between a transmitter and a receiver. However, in case a UE has high mobility as in V2X communication, beam matching failure, errors, etc. may occur due to changes in the location of the UE in the beamforming process. In addition, if a number of UEs perform beam searching, it may cause significant overhead. For example, as shown in FIG. 11, when V2X UEs perform beam scanning in the mmWave system, each UE should perform beam searching with respect to too many beams. However, if all UEs perform beam searching with respect to all directions/regions, it may cause significant overhead as described above. Therefore, to solve such a problem, an efficient beam searching/transmission method will be explained in the following description.

Embodiment

According to an embodiment of the present invention, a UE (first UE) can perform beam searching/beam transmission using location information of a peer UE (second UE). In other words, the first UE may receive the location information from the second UE and perform either or both of the beam searching and beam transmission for an area determined based on the received location information. That is, using the location information of the peer UE, the first UE performs a process for transmitting a transmission beam and searching for a reception beam only within the area where the peer UE is expected to be located. In particular, this can be applied to unicast. If the beam searching/transmission is performed in a limited direction based on the location information as shown in the example of FIG. 11, the overhead thereof can be reduced.

The location information can be transmitted to the first UE, being included in a control signal such as a physical layer/MAC/RRC signal.

The frequency band where the location information is transmitted may be different from the frequency band where the beam searching or beam transmission is performed for the area determined based on the location information. For example, the frequency band in which the location information is received may be lower than the frequency band in which either or both of the beam searching and beam transmission is performed. That is, neighboring UEs may share their location information by transmitting control information using wide coverage in a low frequency band. Alternatively, a neighboring eNB or RSU may broadcast, as the location information of a neighboring UE, some or all of the following: UE ID, location information, speed information, and information indicating whether a higher-layer event occurs. Thereafter, a UE may receive the information of the neighboring UE from the eNB or RSU and use the received information in setting a beam transmission/searching direction.

The frequency band where the location information is transmitted may be equal/similar to the frequency band where the beam searching or beam transmission is performed for the area determined based on the location information. For example, the location information transmission and the beam searching or transmission for the area based thereon may be performed in a frequency band of 6 GHz or higher. For control information, transmission of multiple wideband beams or sharp beams should be supported. That is, a rule may be defined such that for the control information transmitted with the location information, the multiple beam transmission should be performed. In addition, if UEs obtains their location information through the multiple beam transmission, the UEs can transmit and receive data signals only in a limited direction on the basis of their higher-layer information (locations, speeds, and specific events (for example, lane change, intersection entrance, accident occurrence, etc.)).

The location information may be valid only during a time period indicated by a time stamp, which is transmitted together with the location information. The time period indicated by the time stamp depends on the speed of the UE that transmits the location information. For example, when a UE moves at a very high speed, the UE may indicate a very short time period through the time stamp because the location information also changes rapidly so that the validity thereof can be guaranteed. If the received location information exceeds a predetermined time period, the UE may determine that the corresponding location is inaccurate and then perform the previous omni-directional beam searching and beamforming.

At least one of a beam direction, a preferential beam searching direction, and a beam width for the beam searching or beam transmission may be determined according to at least one of a location, a speed, a moving direction, a service, a packet latency requirement, etc. This operation may be performed by the first UE, which receives the location information of the second UE and then performs the beam searching or beam transmission for the area determined based thereon. Alternatively, the operation may be performed regardless of the reception of the location information. Hereinafter, the configuration that depends on individual elements such as a location, a speed, a moving direction, a service, a packet latency requirement, etc. will be described in detail.

Depending on the location and/or speed of a UE, beamforming directions or beam searching candidates may be limited, or the order of beams to be preferentially searched for during the beam searching or beam width may be changed. For example, the directions of beams to be searched for and/or preferential beams may depend on the place where the UE is, for example, a parking lot, a highway, and a normal road. In other words, according to the location of the UE or the place at which the UE is (i.e., place characteristics) (in this case, the place characteristics may include at least one of the number of statistical UEs at the place where the UE is, a statistical moving direction, and a statistical speed), the configuration setting of the beam directions/preferential beam directions/beam widths/beam searching areas may vary.

As a particular example, if a UE is in a parking lot, the UE should perform the beam searching in all directions. If a UE is on a normal road, the UE should perform the beam searching in the rear direction at an angle of 60 degrees. If a UE is on a highway, the UE should perform the beam searching in the front and rear directions at an angle of 30 degrees. In a parking lot, since a UE may move slowly, a collision with another vehicle may occur in all directions, and thus the UE can perform the beam searching in all directions. If a UE is on a normal road or high way where the average UE speed is relatively high, the UE's interesting range may be changed. For example, compared to the normal road where many neighboring vehicles cut into lanes or change their paths, such sudden changes do not frequently occur on the high way. Thus, the UE may reduce the beam searching area on the highway. In other words, when the first UE is on a highway, the preferential beam searching direction may cover a smaller area than when the first UE is on a normal road. Although the beam searching area can be adjusted as described above, the beam width used for the initial beam searching can also be adjusted. For example, as the UE speed increases, the beam width may decrease. On the contrary, as the UE speed decreases, the beam width may increase. That is, when the first UE is on a highway, the beam width may be smaller than when the first UE is on a normal road.

Figure 12:
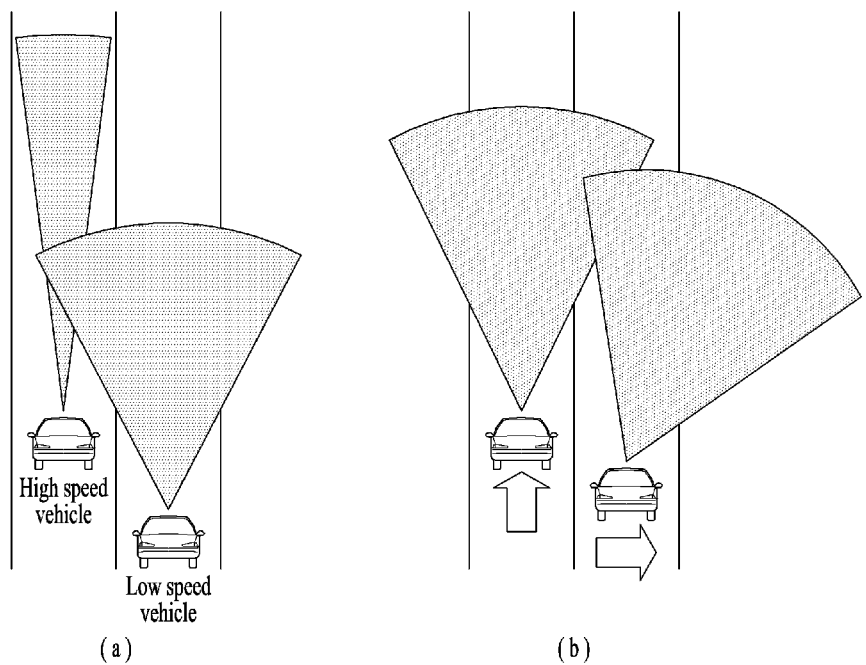

As another example, as shown in FIG. 12(*a*), as the first UE's speed increases, the beam width for the beam searching may decrease. Since when a UE moves at a low speed, the UE can easily change its moving direction, the UE should search for beams in a wide area. On the contrary, when a UE moves at a high speed, the UE can search for beams in a small area.

As shown in FIG. 12(*b*), the moving direction of the first UE may change at least one of a beam direction, a preferential beam searching direction, and a beam width. Depending on the moving direction of a UE (heading) (for example, the moving direction may be determined based on the operation of a turn signal indicator and/or by a sensor mounted in a vehicle), beamforming directions or beam searching candidates may be limited, or the order of beams to be preferentially searched for during the beam searching or beam width may be changed. By transmitting a specific message to another UE existing in the same direction as that in which the HE is moving, the UE can rapidly transmit and receive safety messages.

In addition, depending on the type of a provided service, beam searching candidates may be limited, or the order of beams to be preferentially searched for during the beam searching may be changed. For example, for a safety message, the beam searching/beam transmission and reception may be performed in a large area. For a service such as See Through, the beam searching/beam transmission and reception may be performed in the front and rear directions. In other words, when the service relates to a safety message, the beam width increases compared to when the service relates to other messages rather than the safety message.

Moreover, depending on a packet latency requirement, at least one of a beam direction, preferential beam searching direction, and a beam width may be changed. For example, if a packet has a low latency requirement, it needs to be quickly transmitted to neighboring UEs, and thus the beam searching may be performed using a wide beam. That is, when the packet latency requirement is low, the beam width decreases compared to when the packet latency requirement is high. As another example, the number of beam searching steps may be changed according to the latency requirement. For example, assuming that hierarchical beam searching is performed, a UE with a low latency requirement may perform two-step beam searching, and a UE with a high latency requirement may perform three-or-four-step beam searching more accurately. To this end, UEs may exchange information on their latency requirements through physical or higher layer signals, and more specifically, the UEs may signal to each other information on the number of beam searching steps.

According to the above-described methods, it is possible to reduce the UE implementation complexity by decreasing the complexity, searching time, and searching order of beam searching. By doing so, even when UEs move at high speeds, the beam searching can be rapidly performed, and thus services can be smoothly provided.

Figure 13:
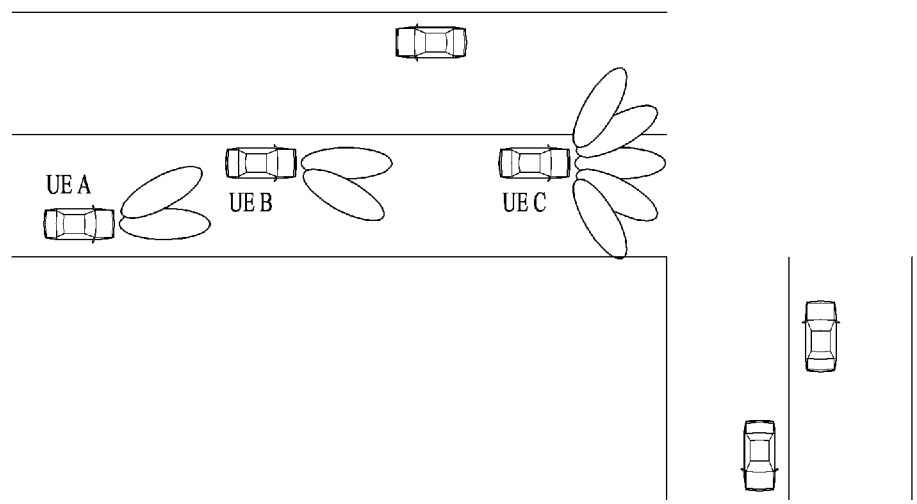

FIG. 13 illustrates an example of a beam transmission/searching method.

According to this method, when a UE changes a lane or is in an intersection (a specific area), the UE may perform beam searching and/or sharp beam repetition transmission in multiple directions (in a less limited and more flexible manner). Referring to FIG. 13, assuming that UEs A and B drive on a straight road and do not need to receive information on the opposite lane due to a median strip, UEs A and B transmit and receive beams with respect to the driving lane and adjacent lanes. Since UE C is going to enter the intersection, UE C transmits/searches for beams in all possible directions. If a UE does not change its lane, the UE may perform beam searching and/or sharp beam repetition transmission (of data) in a specific (limited) direction. This method could be interpreted to mean that the UE transmits a broadcast message.

Meanwhile, the same method may be used when Vehicle UEs (V-UEs) transmit and receive signals to and from an eNB or RSU. To this end, the V-UEs should be able to obtain the location information of an adjacent eNB or RSU. The eNB or RSU can broadcast the location information periodically, and in this case, the location information may be broadcast at other carrier frequencies instead of a mmWave band. When a V-UE transmits and receives signals to and from an eNB or RSU using location information, the V-UE may perform the beam transmission/searching in a limited direction.

In the case of a broadcast message, a UE may perform the beam transmission/searching only in the UE's moving direction or interesting directions. Depending on the location, speed, and moving direction of a (transmitting) UE and a specific event of the transmitting UE (for example, lane change, intersection entrance, accident occurrence, etc.), the direction of a transmission beam and the searching direction for a received beam may be determined.

Depending on higher layer information (the location, speed, and moving direction of a (transmitting) UE and a specific event of the transmitting UE (for example, lane change, intersection entrance, accident occurrence, etc.)), at least one of the number of times of beam transmission, beam directions, the number of times of reception beam searching, and direction information may be determined in advance. Alternatively, a network may signal at least one of the number of times of beam transmission, beam directions, the number of times of reception beam searching, and direction information (to be used by a UE), which depend on higher layer information (the location, speed, and moving direction of a (transmitting) UE and a specific event of the transmitting UE (for example, lane change, intersection entrance, accident occurrence, etc.)) to the UE through a higher layer or physical layer signal.

Since each embodiment of the above-described proposed method can be considered as one method for implementing the present invention, it is apparent that each embodiment can be regarded as a proposed method. In addition, the present invention can be implemented not only using the proposed methods independently but also by combining (or merging) some of the proposed methods. Moreover, a rule may be defined such that information on whether the proposed methods are applied (or information on rules related to the proposed methods) should be transmitted from an eNB to a UE through a predefined signal (e.g., physical layer signal, higher layer signal, etc.), a transmitting UE signals the information to a receiving UE, or a receiving UE requests a transmitting UE to transmit the information.

Device Configurations According to Embodiments of the Present Invention

Figure 14:
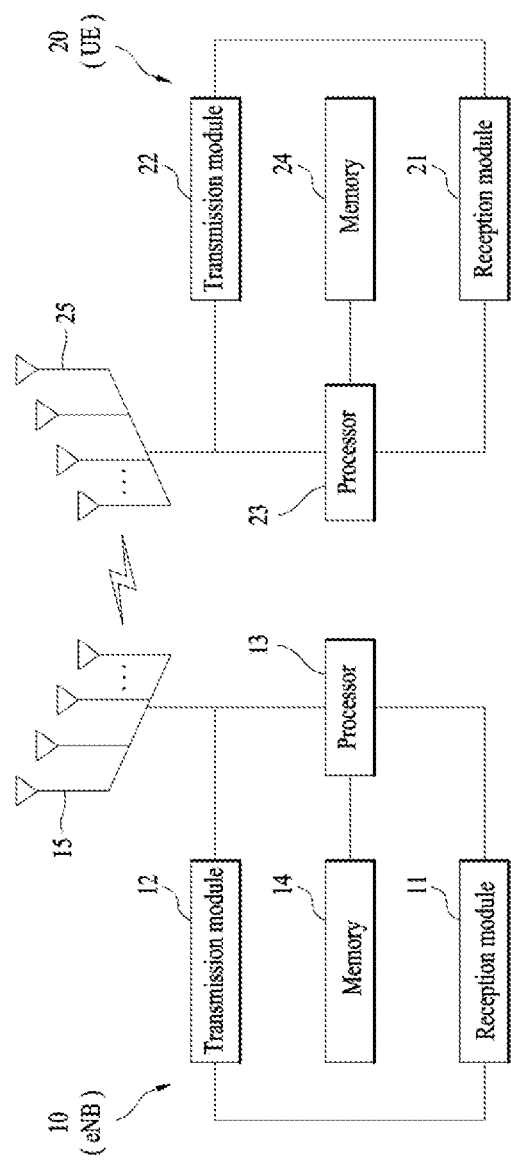
FIG. 14 is a diagram for configurations of a transmitter and a receiver.

FIG. 14 is a diagram illustrating configurations of a transmission point device and a UE device according to an embodiment of the present invention.

Referring to FIG. 14, a transmission point device 10 may include a receiving module 11, a transmitting module 12, a processor 13, a memory 14, and a plurality of antennas 15. The plurality of the antennas 15 may mean that the transmission point device supports MIMO transmission and reception. The receiving module 11 may receive various signals, data and information from a UE in uplink. The transmitting module 12 may transmit various signals, data and information to the UE in downlink. The processor 13 may control overall operation of the transmission point device 10.

The processor 13 of the transmission point device 10 according to an embodiment of the present invention may perform the processes required in the above-described embodiments.

In addition, the processor 13 of the transmission point device 10 may perform a function of processing information received by the transmission point device 10, information to be transmitted by the transmission point device 10, and the like. The memory 14 may store the processed information during a prescribed time period and be substituted with a component such as a buffer (not shown in the drawing) or the like.

Referring to FIG. 14, a UE device 20 may include a receiving module 21, a transmitting module 22, a processor 23, a memory 24, and a plurality of antennas 25. The plurality of antennas 25 may mean that the UE device supports MIMO transmission and reception. The receiving module 21 may receive various signals, data and information from an eNB in downlink. The transmitting module 22 may transmit various signals, data and information to the eNB in uplink. The processor 23 may control overall operation of the UE device 20.

The processor 23 of the UE device 20 according to an embodiment of the present invention may perform the processes required in the above-described embodiments. Specifically, the processor may be configured to: receive location information from a second UE through the receiving module; and perform either or both of beam searching and beam transmission for an area determined based on the received location information. In this case, at least one of a beam direction, a preferential beam searching direction, and a beam width for the beam searching or beam transmission may be determined according to at least one of a location, a speed, a moving direction, a service, and a packet latency requirement of a first UE.

In addition, the processor 23 of the UE device 20 may perform a function of processing information received by the UE device 20, information to be transmitted by the UE device 20, and the like. The memory 24 may store the processed information during a prescribed time period and be substituted with a component such as a buffer (not shown in the drawing) or the like.

The configurations of the transmission point device and the UE device may be implemented such that the above-described embodiments can be independently applied or two or more thereof can be simultaneously applied, and redundant description is omitted for clarity.

The description of the transmission point device 10 in FIG. 14 may be equally applied to a relay as a downlink transmission entity or an uplink reception entity, and the description of the UE device 20 in FIG. 14 may be equally applied to a relay as a downlink reception entity or an uplink transmission entity.

The embodiments according to the present invention may be implemented by various means, for example, hardware, firmware, software, or their combination.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

What is claimed is:

1. A method for performing beam searching or beam transmission by a first user equipment (UE) in a wireless communication system, the method. comprising:
   receiving location information from a second UE; and
   performing either or both of the beam searching and beam transmission for an area determined based on the received location information,
   wherein at least one of a beam direction, a preferential beam searching direction, and a beam width the beam searching or beam transmission is determined according to at least one of a location, a speed, a moving direction, a service, and a packet latency requirement of the first UE,
   wherein a frequency band in which the location information is received is lower than a frequency band in which the either or both of the beam searching and beam transmission is performed, and
   wherein as e speed of the first UE increases, the beam width for the beam searching decreases.

2. The method of claim 1, wherein the location information is included in control information.

3. The method of claim 1, wherein the location information is valid only during timer period indicated by a time stamp transmitted together with the location information.

4. The method of claim 1, wherein when the first UE is in a parking lot, the beam direction includes all directions.

5. The method of claim 1, wherein when the first UE is on a highway, the preferential beam searching direction covers a smaller area than when the first UE is on a non-highway road.

6. The method of claim 1, wherein when the first UE is on a highway, the beam width is smaller than when the first UE is on a non-highway road.

7. The method of claim 1, wherein the moving direction of the first UE changes the at least one of the beam direction, the preferential beam searching direction, and the beam width.

8. The method of claim 1, wherein when the service relates to a safety message, the beam width increases compared to when the service relates to other messages excluding the safety message.

9. The method of claim 1, wherein when the packet latency requirements low, the beam width decreases compared to when the packet latency requirement is high.

10. The method of claim 1, wherein the first UE is a Vehicle User Equipment (VUE).

11. A first user equipment for performing beam searching or beam transmission in a wireless communication system, the first UE comprising:
   a transmitter;
   a receiver; and
   a processor,
   wherein the processor configured to:
   control the receiver to receive location information from a second UE, and
   perform either or both of the beam searching and beam transmission for an area determined based on the received location information through the transmitter,
   wherein at least one of a beam direction, a preferential beam searching direction, and a beam width for the beam searching or beam transmission is determined according to at least one of a location, a speed, a moving direction, a service, and a packet latency requirement of the first UE,
   wherein a frequency band in which the location information is received s lower than a frequency band in which the either or both of the beam searching and beam transmission is performed, and
   wherein as the speed of the first UE increases, the beam width for the beam searching decreases.

* * * * *